United States Patent [19]
Yoshida

[11] Patent Number: 5,126,741
[45] Date of Patent: Jun. 30, 1992

[54] REPRODUCTION APPARATUS HAVING CIRCUIT FOR ACCURATELY DETECTING A BINARY WAVEFORM FROM A VARYING LEVEL ANALOG SIGNAL

[75] Inventor: Takaharu Yoshida, Yokohama, Japan

[73] Assignee: Kabushiki Kaisha Toshiba, Kawasaki, Japan

[21] Appl. No.: 586,986

[22] Filed: Sep. 24, 1990

[30] Foreign Application Priority Data

Sep. 29, 1989 [JP] Japan .................................. 1-252166

[51] Int. Cl.⁵ .............................................. H03M 1/34
[52] U.S. Cl. ...................................... 341/155; 369/59
[58] Field of Search ............... 341/155, 139, 157, 158, 341/165, 166, 137; 369/54, 58, 59, 111, 124, 275

[56] References Cited

U.S. PATENT DOCUMENTS 3,936,819  2/1976  Angelle et al. ..................... 341/139
4,961,182  10/1990  Saito et al. ........................... 369/124

Primary Examiner—A. D. Pellinen
Assistant Examiner—Brian K. Young
Attorney, Agent, or Firm—Finnegan, Henderson, Farabow, Garrett and Dunner

[57] ABSTRACT

A binary signal detector includes a delay circuit for delaying an analog signal reproduced from an optical disk by a predetermined period of time so as to output a delayed analog signal which is delayed from the change in level of the analog signal and varies in proportion to the level change, a reference signal generator for providing an analog reference signal which is changes in proportion to the level change of the analog signal and has a larger amplitude than the delayed analog signal, and a comparator for comparing the level of the analog reference signal with that of the delayed analog signal, and generating a binary output having a logic level corresponding to the binary data when the signal level of the analog reference signal is different from that of the delayed analog signal.

12 Claims, 5 Drawing Sheets

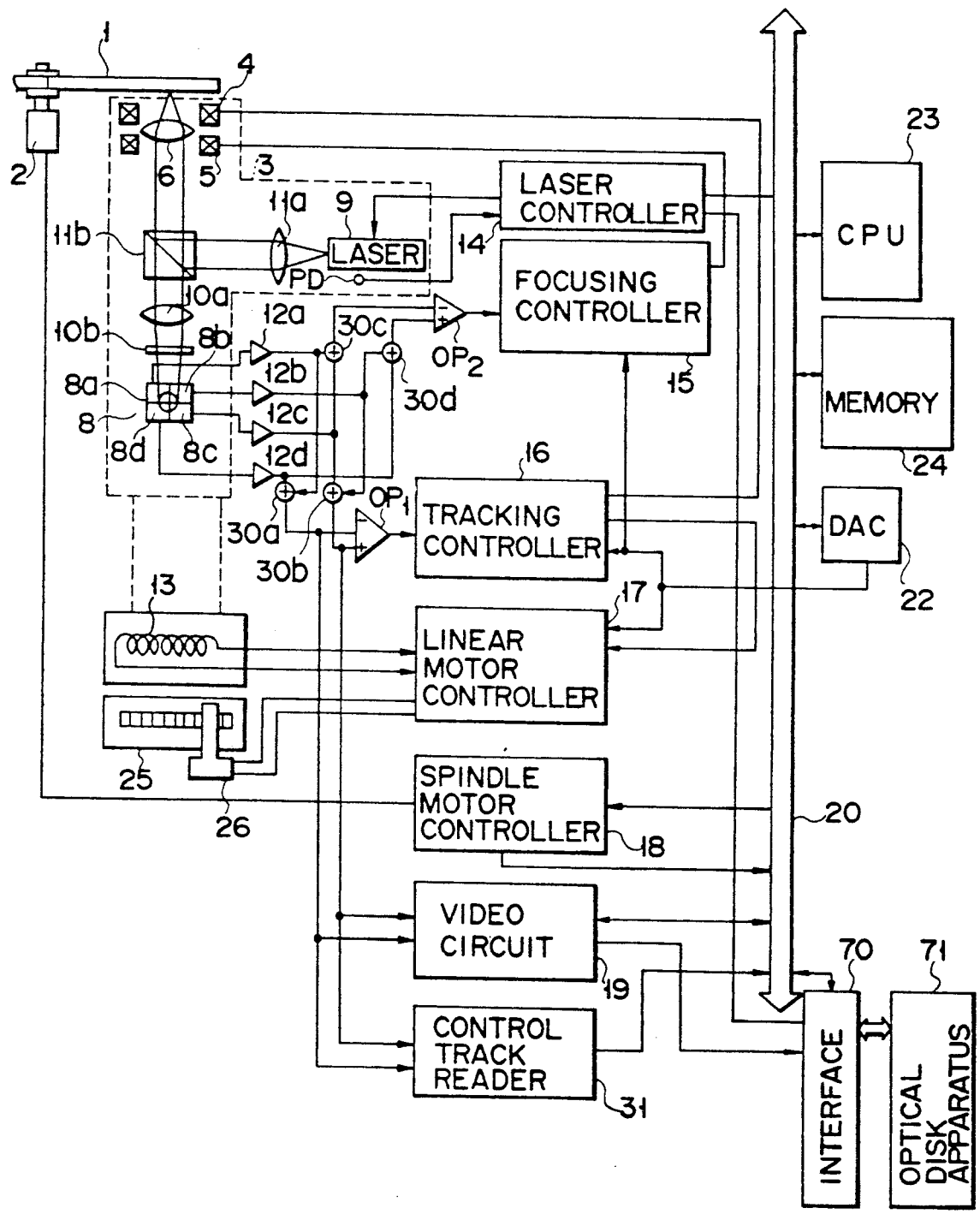
F I G. 2

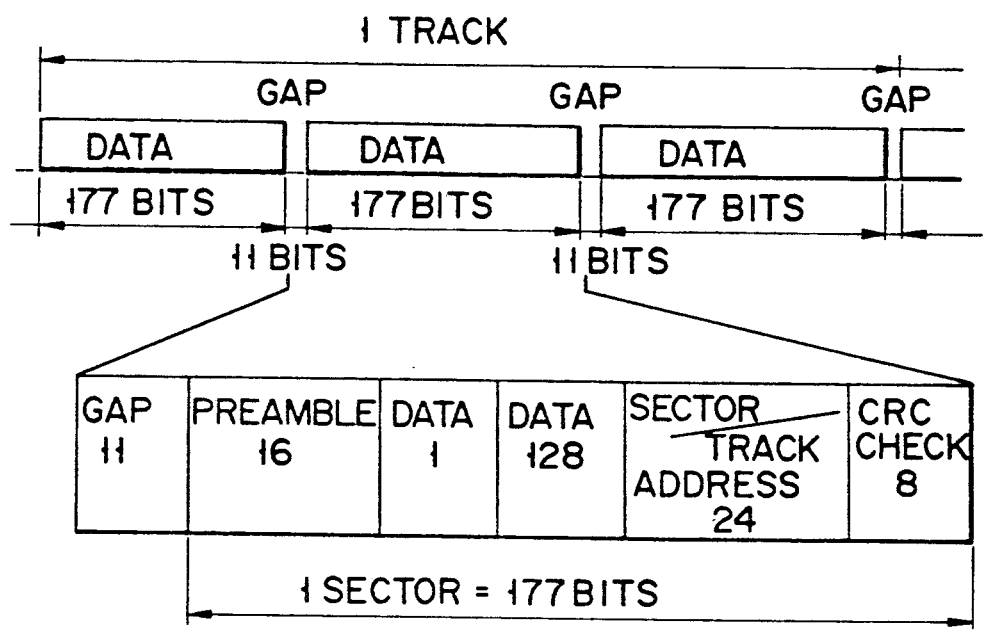
F I G. 4
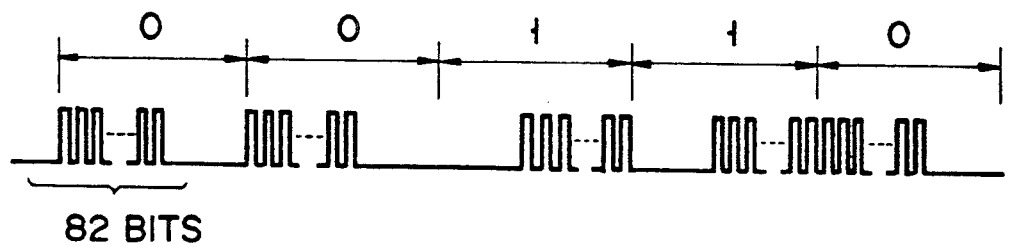
F I G. 5

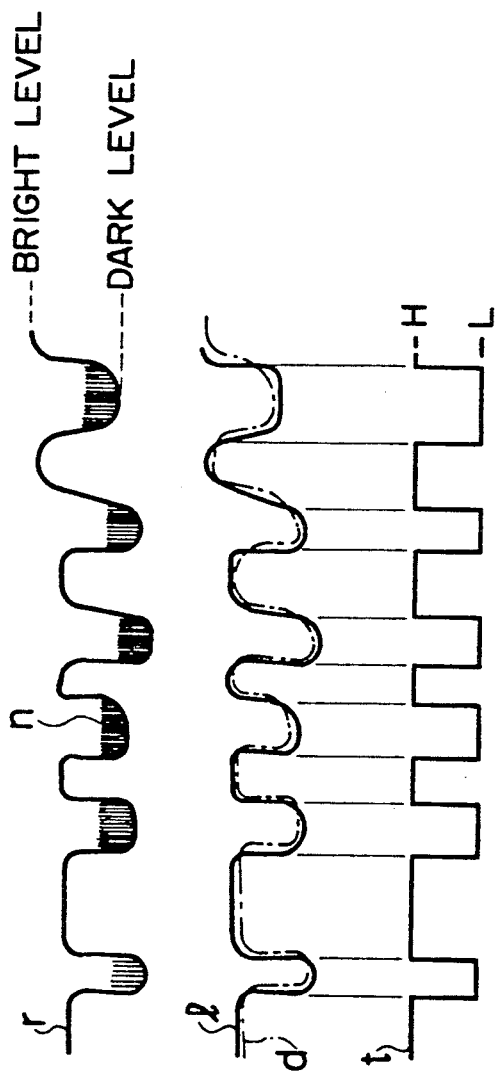

REPRODUCTION APPARATUS HAVING CIRCUIT FOR ACCURATELY DETECTING A BINARY WAVEFORM FROM A VARYING LEVEL ANALOG SIGNAL

BACKGROUND OF THE INVENTION

1. Field of the Invention

The present invention relates to a device for detecting an accurate binary signal from a reproduction output having level variations in a disk apparatus for recording/reproducing data in/from, e.g., an optical disk.

2. Description of the Related Art

As is well known, various types of disk apparatuses for recording data in an optical disk or reading data recorded in the optical disk by using a laser beam emitted from, e.g., a semiconductor laser have been developed.

In the above-mentioned optical disk apparatuses, in order to standardize optical disks, a characteristic data record area is arranged outside a record area (i.e., a region in an inner circumferential portion where no guide grooves and servo bytes are present) of each optical disk. As characteristic data to be recorded in this area, mode data (corresponding to specifications) called a control track is considered. Such control tracks as bar codes are to be commonly recorded in optical disks available from any manufacturers.

Data such as a reflectivity, writing/reading laser power, the number of sectors per track (360°) of an optical disk are to be recorded in this control track to determine read and write modes (specifications).

In a conventional optical disk apparatus, although methods of accurately reading control tracks have been studied, no study has been made on methods of accurately reading control tracks in a region having no guide grooves and servo bytes in consideration of eccentricity.

The conventional apparatus, therefore, has the following drawback. If eccentricity of an optical disk is large, a control track (characteristic data) recorded in the characteristic data record area having no guide grooves and servo bytes cannot be accurately read.

SUMMARY OF THE INVENTION

It is the first object of the present invention to provide a binary signal detector which can generate a binary signal accurately corresponding to binary data of an analog signal by using the analog signal even if the analog signal is subjected to level variations.

It is the second of the present invention to provide a optical disk apparatus which can accurately extract binary data recorded in a disk from a binary data reproduction output (analog signal) from an optical disk even if the reproduction output suffers from level variations due to eccentricity of the optical disk.

It is the third object of the present invention to provide a disk apparatus which can accurately read characteristic data from a signal having level variations such as a reproduction signal of characteristic data of a record area having no guide grooves and servo bytes.

In order to achieve the first object, according to the present invention, there is provided a binary signal detector comprising a delay circuit for delaying an analog signal reproduced from an optical disk or the like by a predetermined period of time so as to output a delayed analog signal which is delayed from the change in level of the analog signal and varies in proportion to the level change, a reference signal generator for providing an analog reference signal proportional to the level change of the analog signal and having a larger amplitude than the delayed analog signal, and a comparator for comparing a level of the analog reference signal with that of delayed analog signal, and generating a binary output having a logic level corresponding to the binary data when the signal level of the analog reference signal is different from that of the delayed analog signal.

In order to achieve the second and third objects, according to the present invention, there is provided a disk apparatus comprising an optical head for detecting light obtained by radiating light on a disk having a data record area in which data as storage data is recorded and a characteristic data record area in which characteristic data as mode data is recorded in a region having no guide grooves and servo bytes, and for performing photoelectric conversion of the detected light; means for moving the optical head into the data record area or the characteristic data record area of the disk; means for detecting a lower edge of a photoelectric conversion output from the optical head when the optical head is moved into the characteristic data record area of the disk by the moving means; means for delaying a detection output from the lower edge detecting means; and means for reading the characteristic data by comparing the detection output from the lower edge detecting means with a delay signal from the delaying means, and obtaining a binary value upon comparison.

According to the present invention, the optical head detects light obtained by radiating light on a disk. The disk has a data record area, in which data as storage data is recorded, and a characteristic data record area, in which characteristic data recorded as mode data is recorded in a region having n guide grooves and servo bytes. The optical head performs photoelectric conversion of the detected light. The optical head is moved into the data record area of the characteristic data record area of the disk by means of the moving means. When the optical head is moved into the characteristic data record area of the disk by the moving means, the lower edge of a photoelectric conversion output from the optical head is detected by the lower edge detecting means. This detection output is then delayed by the delay means, and the detection output from the lower edge detecting means and the delay signal from the delay means are compared with each other to obtain a binary value, thereby reading the characteristic data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a block diagram showing an arrangement of a disk apparatus;

FIG. 4 is a view showing an arrangement of bits in a control track;

FIG. 5 is a view for explaining pit strings corresponding to bit data in FIG. 4;

FIG. 6 is a view for explaining an arrangement of a control track; and

FIGS. 7A to 7C are timing charts showing signal waveforms at the respective components of a control track reader.

DETAILED DESCRIPTION OF THE PREFERRED EMBODIMENT

An embodiment of the present invention will be described below with reference to the accompanying drawings.

FIG. 2 shows a disk apparatus. Grooves (record tracks) are spirally formed in a surface of optical disk (disk) 1. Optical disk 1 is rotated at, e.g., a constant speed by motor 2. Motor 2 is controlled by spindle motor controller 18.

Optical disk 1 has a size of, e.g., 5.25 inches (about 13.3 cm) and is designed such that a metal coating layer consisting of tellurium or bismuth, i.e., a recording layer, is coated on a surface of a circular glass or plastic substrate in the form of a doughnut, and notched portions, i.e., reference position marks, are formed near the center of the metal coating layer.

Figure 3:
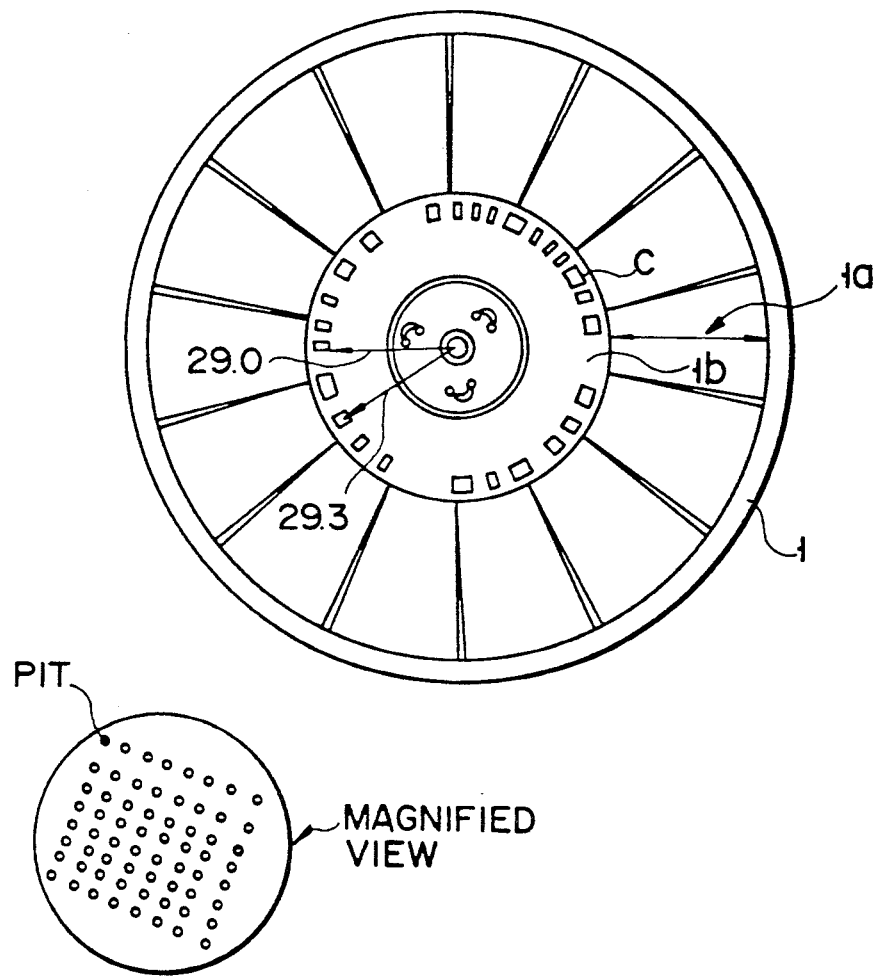
FIG. 3 is a view for explaining a control track of an optical disk.

In addition, as shown in FIG. 3, data record area 1a and characteristic data record area 1b are formed on optical disk 1. Guide grooves (record tracks) are formed in the data record area 1a. Characteristic data record area 1b is formed closer to the center of optical disk 1 than data record area 1a and includes no guide grooves and servo bytes.

Control track C is to be recorded in characteristic data record area 1b in advance in the process of manufacturing optical disk 1. Three sets of identical characteristic data are formed on control track C per revolution in the form of bar code data in the circumferential direction. This characteristic data includes the characteristics (reflectivity) of a film of optical disk 1, the recording/reproducing power of a semiconductor laser, a format (the number of sectors per revolution), and the like. Above-mentioned continuity and discontinuity of pit strings and is radially recorded in the radial direction of optical disk 1. The recording position of control track C is defined by the distance from the center of optical disk 1 (radial position).

For example, above-mentioned control track C is recorded between a position 29.0 mm away from the center and a position 29.3 mm away from the center.

Note that any one of the CAV (constant angular velocity), CLV (constant length velocity), and MCAV (modified CAV) recording schemes can be employed as a recording scheme for the optical disk shown in FIG. 3.

As shown in FIG. 4, control track C is constituted by three sectors. Each sector is constituted by a gap, a preamble, a sync signal, characteristic data, sector/track address data, CRC check data, and the like.

One-bit data of control track C is designed as follows. As shown in FIG. 5, if 82 pits constituting a pit string are continuously formed in the first half of a given bit portion, "0" is determined. If they are formed in the second half, "1" is determined.

In addition, one-bit data of control track C is designed as follows. As shown in FIG. 6, if a plurality of pit strings are present in 328 channel bits of the first half of a given bit portion, "0" is determined. If they are present in 328 channel bits of the second half, "1" is determined.

Above-mentioned data record area 1a is divided into a plurality of sectors with reference to the reference marks. Variable length data are recorded on optical disk 1 over a plurality of blocks. 300,000 blocks are formed on 36,000 tracks on optical disk 1.

Information is recorded/reproduced on/from optical disk 1 by optical head 3. Optical head 3 is fixed to drive coil 13 constituting a movable portion of a linear motor. Drive coil 13 is connected to linear motor controller 17.

Linear motor position detector 26 is connected to linear motor controller 17. Upon detection of optical scale 25 arranged on optical head 3, linear motor position detector 26 outputs a position signal.

In addition, a permanent magnet (not shown) is arranged on the stationary portion of the linear motor so that when drive coil 13 is excited by linear motor controller 17, optical head 3 is moved in the radial direction of optical disk 1.

Objective lens 6 is held on optical head 3 by a wire or a leaf spring (not shown). Objective lens 6 is moved in the focusing direction (the direction of the optical axis of lens 6) by drive coil 5 and is moved in the tracking direction (the direction perpendicular to the optical axis of lens 6).

A laser beam generated by semiconductor laser 9 driven by laser controller 4 is radiated on optical disk 1 through collimator lens 11a, half prism 11b, and objective lens 6. The laser beam reflected by optical disk 1 is guided to photodetector 8 through half prism 11b, condenser lens 10a, and cylindrical lens 10b.

Photodetector 8 is constituted by four identical photodetector cells 8a, 8b, 8c, and 8d.

Since an objective lens driving unit using wires 4 and 5 is known from, for example, Japanese Patent Application No. 61-284591, a description thereof will be omitted.

An output signal from photodetector cell 8a of photodetector 8 is supplied to one terminal of each of adders 30a and 30c through amplifier 12a. An output signal from photodetector cell 8b is supplied to one terminal of each of adders 30b and 30d through amplifier 12b. An output signal from photodetector cell 8c is supplied to the other terminal of each of adders 30b and 30c through amplifier 12c. An output signal from photodetector detector cell 8d is supplied to the other terminal of each of adders 30a and 30d through amplifier 12d.

An output signal from adder 30a is supplied to the inverting input terminal of differential amplifier OP1. An output signal from adder 30b is supplied to the noninverting input terminal of differential amplifier OP1. As a result, differential amplifier OP1 supplies a track difference signal corresponding to a difference between the outputs from adders 30a and 30b to tracking controller 16. Tracking controller 16 generates a track drive signal in accordance with the track difference signal supplied from differential amplifier OP1.

The track drive signal output from tracking control circuit 16 is supplied to drive coil 4 for driving objective lens 6 in the tracking direction. In addition, the track difference signal used by tracking controller 16 is supplied to linear motor controller 17.

An output signal from adder 30c is supplied to the inverting input terminal of differential amplifier OP2. An output signal from adder 30d is supplied to the non-inverting input terminal of differential amplifier OP2. As a result, differential amplifier OP2 supplies a signal associated with a focal point to focusing controller 15 in accordance with a difference between the outputs from adders 30c and 30d. An output signal from focusing controller 15 is supplied to focusing drive coil 5 to control a laser beam to be always radiated on optical disk 1 in an in-focus state.

Sum signals of outputs from photodetector cells 8a to 8d of photodetector 8, i.e., output signals from adders 30a and 30b, which are obtained after focusing and tracking are performed in the above-described manner, reflect a three-dimensional pattern of pits (recorded data) formed in a track. Such a signal is supplied to video circuit 19 to reproduce image data and address data (a track number, a sector number, and the like).

The reproduction signal reproduced by video signal 19 is output to optical disk apparatus 71 as an external unit through interface 70.

The output signals from adders 30a and 30b are also supplied to control track reader 31. Control track reader 31 outputs a binary signal corresponding to recorded data of control track C in accordance with the output signals from adders 30a and 30b.

When control track C is to be accessed, the binary signal is output to CPU 23 (to be described later).

When control track C is to be accessed, CPU 23 moves optical head 3 from the innermost circumference of optical disk 1. When optical head 3 is moved by a distance corresponding to a scale of 11.5 of optical scale 25, CPU 23 determines that the position of optical head 3 corresponds to a portion near the center of control track C, and stops optical head 3. At this time, CPU 23 reads the characteristic data of control track C by checking the time interval between high level and low level of a binary signal supplied from a comparator (to be described later) of control track reader 30, and performs a control operation corresponding to the read characteristic data. That is, CPU 23 can perform control operations corresponding to various specifications (manufacturers) of optical disks 1.

The disk apparatus of this embodiment further includes a D/A converter 22 for data communication among focusing controller 15, tracking controller 16, linear motor controller 17, and CPU 23.

Tracking controller 16 moves objective lens 6 in accordance with a track jump signal supplied from CPU 23 through D/A converter 22 so as to move a laser beam by a distance corresponding to one track.

Laser controller 14, focusing controller 15, tracking controller 16, linear motor controller 17, spindle motor controller 18, video circuit 19, and the like are controlled by CPU 23 through bus line 20. CPU 23 is designed to perform a predetermined operation in accordance with a program stored in memory 24.

Figure 1:
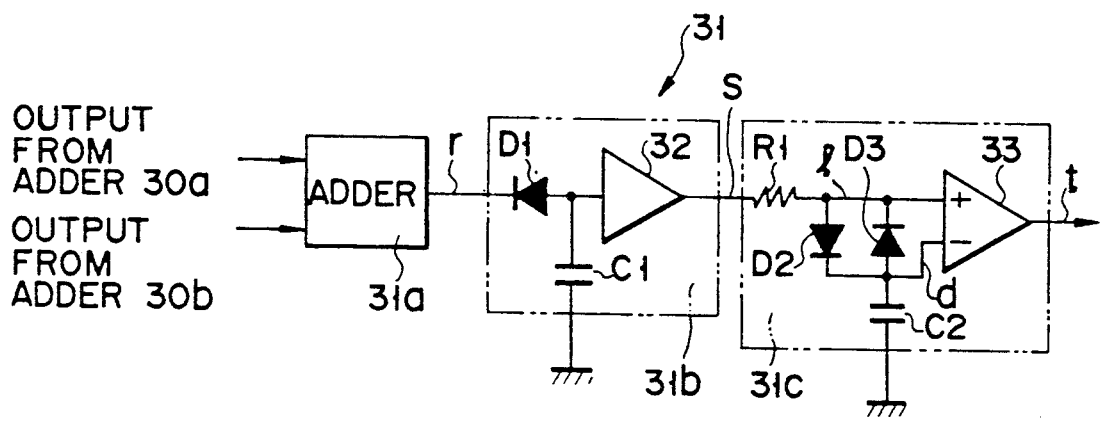
FIG. 1 is a circuit diagram showing an embodiment wherein a binary signal detector of the present invention is applied to an optical disk apparatus.

As shown in FIG. 1, control track reader 31 is constituted by adder 31a, lower edge detector 31b, and binary value generator 31c. Lower edge detector 31b comprises amplifier 32 and an integrator constituted by diode D1 and capacitor C1. Binary value generator 31c comprises diodes D2 and D3, resistor R1, capacitor C2, and comparator 33. The integrator (D1, C1) serves to remove noise (n() from signal r shown in FIG. 7A.

Adder 31a adds the output signals from adders 30a and 30b together so as to output reproduction signal r corresponding to the sum of detection signals from photodetector cells 8a to 8d. Lower edge detector 31b outputs a lower edge detection signal (a signal obtained by detecting a dark level peak of reproduction signal r) l from adder 31a. IN binary value generator 31c, comparator 33 compares lower edge detection signal l from lower edge detector 31b with delay signal d obtained by delaying lower edge detection signal l. If lower edge detection signal l > delay signal d, comparator 33 outputs a signal of "H" level. If lower edge signal l < delay signal d, comparator 33 out-puts a signal of "L" level. With this operation, binary value generator 31c outputs binary signal t corresponding to the recorded data of control track C to CPU 23.

For example, lower edge detection signal l (see FIG. 7B) is detected from reproduction signal r shown in FIG. 7A, and signal l is converted into a binary value by comparing lower edge detection signal l with delay signal d obtained by delaying lower edge detection signal l, thereby obtaining binary signal t (see FIG. 7C).

A reading operation for control track C in the above-described arrangement will be described below. Assume that a command for access to control track C is supplied from optical disk controller 7 to CPU 23. CPU 23 then controls linear motor controller 17 to move optical head 3 outward from the innermost circumference of optical disk 1.

When linear motor 41 moves optical head 3 by a distance corresponding to a scale of 11.5, i.e., a laser beam from optical head 3 corresponds to a position near the center of control track C, CPU 23 stops optical head 3.

Subsequently, CPU 23 causes semiconductor laser 9 to emit a laser beam. The laser beam emitted from semiconductor laser 9 is radiated on optical disk 1 through collimator lens 11a, half prism 11b, and objective lens 6. The laser beam reflected by optical disk 1 is guided to photodetector 8 through half prism 11b, condenser lens 10a, and cylindrical lens 10b.

An output signal from photodetector cell 8a of photodetector 8 is supplied to one terminal of each of adders 30a and 30c through amplifier 12a. A signal from photodetector cell 8b is supplied to one terminal of each of adders 30b and 30d through amplifier 12b. An output signal from photodetector cell 8c is supplied to the other terminal of each of adders 30b and 30c through amplifier 12c. An output signal from photodetector cell 8d is supplied to the other terminal of each of adders 30a and 30d through amplifier 12d.

In this state, signals from adders 30a and 30b are supplied to adder 31a. Adder 31a then outputs reproduction signal r (shown in FIG. 7A) corresponding to the sum of the detection signals from photodetector cells 8a to 8d to lower edge detector 31b.

Lower edge detector 31b detects the lower edge of reproduction signal r from adder 31a and outputs lower edge detection signal l (indicated by a solid curve in FIG. 7B) to binary value generator 31c. In binary value generator 31c. comparator 33 compares lower edge detection signal l from lower edge detector 31b with delay signal d (indicated by a dotted curve in FIG. 7B) obtained by delaying lower edge detection signal l. If lower edge detection signal l > delay signal d, comparator 33 outputs a signal of "H" level. If lower edge detection signal l < delay signal d, comparator 33 outputs a signal of "L" level. With this operation, binary value generator 31c outputs binary signal t (see FIG. 7C) corresponding to the recorded data of control track C to CPU 23.

At this time, CPU 23 reads the characteristic data of control track C by checking the time interval between high level and low level of binary signal t supplied from comparator 33 in control track reader 31, and performs a control operation corresponding to the read characteristic data. That is, CPU 23 performs control operations corresponding to various specifications (manufacturers) of different optical disks 1.

For example, control is performed in accordance with specifications corresponding to the characteristics (reflectivity) of optical disk 1, the recording/reproducing power of a semiconductor laser, a format (the number of sectors per revolution), and the like.

As described above, in the present invention, a dark level peak of a reproduction signal is detected, and the peak signal is compared with a delay signal obtained delaying the peak signal so as to convert the reproduction signal into a binary value, thereby reproducing an accurate binary signal.

With this operation, the characteristic data of a control track in a characteristic data record area where no guide grooves and servo bytes are present can be read without being influenced by eccentricity and the like. Even if an eccentricity amount varies depending on a type of optical disk, the characteristic data of a control track can be reliably read.

FIG. 1 shows an arrangement of an optical disk apparatus to which a binary signal detector according to the present invention is applied. The present invention can be widely applied to cases wherein binary data is to be accurately detected from an analog signal having level variations without being influenced by the level variations.

Figure 1A:
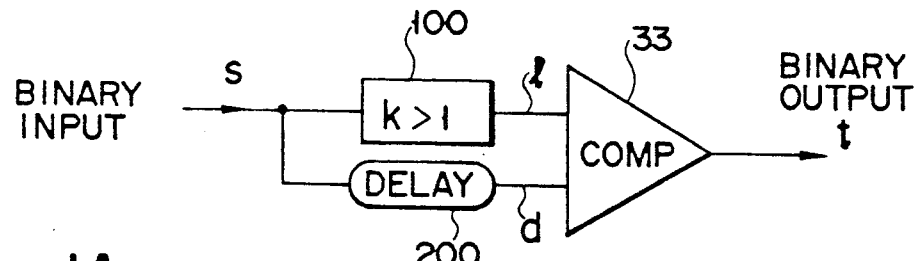
FIG. 1A is a circuit diagram showing a basic arrangement of the binary signal detector of the present invention.
Figure 1B:
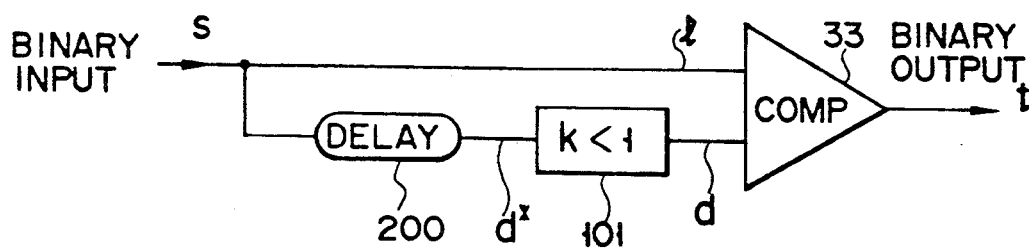
FIG. 1B is a circuit diagram showing another basic arrangement of the binary signal detector of the present invention.

FIGS. 1A and 1B show basic arrangements of such a general-purpose binary signal detector.

A binary signal detector shown in FIG. 1A comprises: delay circuit 200 for delaying analog signal s (corresponding to signal r in FIG. 7A) having level variations by a predetermined period of time so as to output delayed analog signal d (FIG. 7B) which is delayed from a change in the level of analog signal s and changes in proportion to the level change of analog signal s; amplifier 100 for amplifying analog signal s at amplification k >1, and providing analog reference signal l having a larger amplitude than delayed analog signal d; and comparator 33 for comparing the level of analog reference signal l with that of delayed analog signal d, and generating binary output t (FIG. 7C) having a logic level corresponding to the binary data when the signal level of analog reference signal l is different from that of delayed analog signal d (e.g., > d).

A binary signal detector shown in FIG. 1B comprises: delay circuit 200 for delaying analog signal s having level variations by a predetermined period of time so as to output delayed analog signal d* which is delayed from a change in the level of analog signal s and changes in proportion to the level change of analog signal s; amplifier 101 for amplifying delayed analog signal d* at amplification k <1 (i.e., attenuating), and providing delayed analog signal d having a smaller amplitude than delayed analog signal d*; and comparator 33 for comparing the level of analog signal s with that of delayed analog signal d, and generating binary output t having a logic level corresponding to the binary data when the signal level of analog signal s is different from that of delayed analog signal d (e.g., s > d).

In both the detectors shown in FIGS. 1A and 1B, since an input signal (s, l) having level variations is compared with a comparison signal (d) having level variations similar to those of the input signal and having a timing slightly delayed with respect to the input signal, the relative level variations between the input signal (s, l) and the comparison signal (d) are canceled. Therefore, the comparison result of these signals accurately represents the binary data without being influenced by the signal level variations.

As has been described in detail above, according to the present invention, there is provided a disk apparatus which can accurately read characteristic data in a characteristic data record area where no guide grooves and servo bytes are present.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A reproduction apparatus for reproducing information from an optical recording medium in accordance with data representative of characteristics of the optical recording medium which are recorded thereon, said apparatus comprising:

means for irradiating light beam to the optical recording medium and generating an analog signal corresponding to said data by receiving light beam reflected from the optical recording medium;

means for delaying the analog signal by a predetermined period of time so as to output a delayed analog signal which is delayed from a change in level of the analog signal and varies in proportion to the level change;

means for providing an analog reference signal which changes in proportion to the level change of the analog signal and having a larger amplitude than the delayed analog signal;

means for comparing a level of the analog reference signal with that of the delayed analog signal, and, when a signal level of the analog reference signal is different from that of the delayed analog signal, generating a binary output having a logic level binary data; and means for reproducing the information from said optical recording medium in accordance with the generated binary output.

2. An apparatus according to claim 1, further comprising means for combining a plurality of photoelectric conversion signals corresponding to pit data recorded in an optical disk, and outputting the analog signal.

3. A circuit for accurately detecting a binary waveform from a varying level analog signal, said detector circuit comprising:

means for delaying by a predetermined period of time an analog signal including binary data and subjected to level variations, and outputting a delayed analog signal whose level change is delayed from a level change of the analog signal and is proportional to the level change of the analog signal;

means for amplifying the analog signal at an amplification factor of not less than 1, and providing an analog reference signal having a larger amplitude than the delayed analog signal; and means for comparing a level of the analog reference signal with that of the delayed analog signal, and generating a binary output having a logic level corresponding to the binary data when the signal level of the analog reference signal is different from that of the delayed analog signal.

4. A disk reading apparatus comprising:

an optical head for detecting light obtained by radiating light on a disk having a data record area in which data as storage data is recorded and a characteristic data record area in which characteristic data as mode data is recorded in a region having no guide grooves and servo bytes, and for performing photoelectric conversion of the detected light;

means for moving said optical head into the data record area or the characteristic data record area of said disk;

means for detecting a lower edge of a photoelectric conversion output from said optical head when said optical head is moved into the characteristic data record area of said disk by said moving means;

means for delaying a detection output from said lower edge detecting means; and means for reading characteristic data by comparing the detection output from said lower edge detecting means with a delayed signal from said delaying means, and obtaining a binary value upon comparison.

5. A reproduction apparatus for reproducing information from an optical recording medium in accordance with data representative of characteristics of the optical recording medium which are recorded thereon, said apparatus comprising:

means for irradiating light beam to the optical recording medium and generating an analog signal corresponding to said data by receiving light beam reflected from the optical recording medium;

means for delaying the analog signal by a predetermined period of time so as to output a delayed analog signal which is delayed from a change in level of the analog signal and varies in proportion to the level change;

said delaying means including means for integrating the analog signal as a function of time to output an integral signal;

said delaying means further including second means for generating a second signal which is proportional to the integral signal, changes in level with a delay from signal level change of the first signal, and has a smaller amplitude than the first signal;

means for providing an analog reference signal which changes in proportion to the level change of the analog signal and having a larger amplitude than the delayed analog signal;

said providing means including first means for outputting a first signal proportional to the analog signal;

means for comparing a level of the analog reference signal with that of the delayed analog signal, and, when a signal level of the analog reference signal is different from that of the delayed analog signal, generating a binary output having a logic level binary data;

said comparing means including means for comparing a signal level of the first signal with that of the second signal, and generating the binary output which is set at a first logic level when the level of the first signal is higher than that of the second signal and is set at a second logic level when the level of the first signal is lower than the second signal; and means for reproducing the information from said optical recording medium in accordance with the generated binary output.

6. An apparatus according to claim 5, wherein said second means includes:

antiparallel-coupled diodes inserted between a signal node of the first signal and a signal node of the second signal, and a capacitor inserted between the signal node of the second signal and a circuit ground.

7. An apparatus according to claim 5, wherein said integrating means includes:

a buffer amplifier for receiving the analog signal to output the integral signal;

a diode inserted between a signal source side of the analog signal and an input side of said buffer amplifier, and a capacitor inserted between the input side of said buffer amplifier and a circuit ground.

8. A reproduction apparatus for reproducing information from an optical recording medium in accordance with data representative of characteristics of the optical recording medium which are recorded thereon, said apparatus comprising:

means for irradiating a light beam to the optical recording medium and generating an analog signal corresponding to said data by receiving light beam reflected from the optical recording medium;

means for delaying the analog signal by a predetermined period of time so as to output a delayed analog signal which is delayed from a change in level of the analog signal and varies in proportion to the level change;

said delaying means including means for integrating the analog signal as a function of time to output an integral signal;

comparison means for generating a comparison signal which is proportional to the integral signal, changes in level with a delay from a signal level change of the integral signal, and has a smaller amplitude than the integral signal;

means for providing an analog reference signal which changes in proportion to the level change of the analog signal and having a larger amplitude than the delayed analog signals;

means for comparing a level of the analog reference signal with that of the delayed analog signal, and, when a signal level of the analog reference signal is different from that of the delayed analog signal, generating a binary output having a logic level binary data;

said comparing means including means for comparing a signal level of the first signal with that of the comparison signal, and generating the binary output which is set at a first logic level when the level of the integral signal is higher than that of the second signal and is set at a second logic level when the level of the integral signal is lower than that of the comparison signal; and means for reproducing the information from said optical recording medium in accordance with the generated binary output.

9. An apparatus according to claim 5, wherein said second means includes:
- antiparallel-coupled diodes inserted between a signal node of the integral signal and a signal node of the comparison signal, and
- a capacitor inserted between the signal node of the comparison signal and a ground circuit.

10. A binary signal waveform converter for converting an analog signal waveform which could be subject to signal level variations into a binary output, said binary waveform converter comprising:
- means for delaying the analog signal waveform by a predetermined period of time so as to output a delayed analog signal waveform which is delayed from the level variations of the analog signal waveform and varies in level in proportion to the level variations;
- means for providing an analog reference signal proportional to the level variations of the analog signal waveform and having a larger amplitude than the delayed analog signal waveform; and
- means for comparing a level of the analog reference signal with that of delayed analog signal waveform so as to generate the binary output having a logic level corresponding to the binary data when signal level of analog reference signal is different from that of delayed analog signal waveform.

11. A converter according to claim 10, further comprising means for synthesizing a plurality of photoelectric conversion signals corresponding to pit data signal waveform.

12. A converter according to claim 10, wherein
said providing means includes first means for outputting a first signal having a waveform proportional to the analog signal waveform,
said delaying means includes:
means for integration the analog signal waveform as a function of time to output an integral signal; and
second means for generating a second signal which is proportional to the integral signal, varies in level with a delay from signal level variations of the first signal, and has a smaller amplitude than the first signal, and
said comparing means includes means for comparing a signal level of the first signal with that of the second signal so as to generate the binary output which is set at a first logic level when the level of the first signal is higher than that of the second signal and is set at a second logic level when the level of the first signal is lower than the second signal.

* * * * *